United States Patent
Strock

(10) Patent No.: US 12,037,920 B2
(45) Date of Patent: Jul. 16, 2024

(54) BLADE WITH ABRASIVE TIP

(71) Applicant: Raytheon Technologies Corporation, Farmington, CT (US)

(72) Inventor: Christopher W. Strock, Kennebunk, ME (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 17/844,234

(22) Filed: Jun. 20, 2022

(65) Prior Publication Data

US 2022/0316341 A1  Oct. 6, 2022

Related U.S. Application Data

(63) Continuation of application No. 16/881,358, filed on May 22, 2020, now Pat. No. 11,365,632.

(51) Int. Cl.
| | | |
|---|---|---|
| *F01D 5/14* | (2006.01) | |
| *B23P 15/02* | (2006.01) | |
| *F01D 5/28* | (2006.01) | |
| *F01D 11/12* | (2006.01) | |
| *F01D 25/00* | (2006.01) | |

(52) U.S. Cl.
CPC .............. *F01D 5/14* (2013.01); *B23P 15/02* (2013.01); *F01D 11/122* (2013.01)

(58) Field of Classification Search
CPC ... F01D 5/14; F01D 5/28; F01D 5/288; F01D 5/20; F01D 5/282; F01D 5/284; F01D 5/286; F01D 11/122; F01D 11/08; F01D 11/12; F01D 11/125; F01D 25/005; F05D 2240/307; F05D 2230/31; F05D 2230/90; F05D 2300/2102; F05D 2300/6033; F04D 29/324; B23P 15/02
See application file for complete search history.

(56) References Cited

U.S. PATENT DOCUMENTS

| | | |
|---|---|---|
| 4,954,609 A | 9/1990 | Vora |
| 10,202,854 B2 | 2/2019 | Uskert et al. |
| 10,221,698 B2 | 3/2019 | Strock et al. |
| 10,233,938 B2 | 3/2019 | Strock |

(Continued)

FOREIGN PATENT DOCUMENTS

| | | | |
|---|---|---|---|
| GB | 2441865 | | 3/2008 |
| JP | 2008214543 A | * | 9/2008 |

OTHER PUBLICATIONS

Machine Translation of JP 2008214543 A [retrieved on Oct. 25, 2023]. Retrieved from: Espacenet. (Year: 2023).*

(Continued)

*Primary Examiner* — Eric J Zamora Alvarez
(74) *Attorney, Agent, or Firm* — Carlson, Gaskey & Olds, P.C.

(57) ABSTRACT

A blade includes an airfoil section extending between leading and trailing edges, first and second opposed sides each joining the leading and trailing edges, and an inner end and a free end. The blade also includes an abrasive tip at the free end of the airfoil section. The abrasive tip includes particles disposed in a matrix material. The matrix material is a polymeric material that has a glass transition temperature greater than or equal to about 225 degrees C. (437 degrees F.). A gas turbine engine and a method of fabricating a blade are also disclosed.

14 Claims, 6 Drawing Sheets

(56) References Cited

U.S. PATENT DOCUMENTS

| | | |
|---|---|---|
| 10,519,786 B2 | 12/2019 | Roussille et al. |
| 11,365,632 B2 * | 6/2022 | Strock ..................... F01D 5/288 |
| 2015/0233255 A1 | 8/2015 | Strock et al. |
| 2016/0177745 A1 | 6/2016 | Uskert et al. |
| 2016/0305442 A1 | 10/2016 | Strock et al. |
| 2019/0195075 A1 | 6/2019 | Strock et al. |
| 2019/0323363 A1 | 10/2019 | Sippel et al. |

OTHER PUBLICATIONS

Extended European Search Report for European Patent Application No. 21175547.5 dated Oct. 8, 2021.

* cited by examiner

BLADE WITH ABRASIVE TIP

CROSS-REFERENCE TO RELATED APPLICATIONS

This application is a continuation of U.S. patent application Ser. No. 16/881,358, filed May 22, 2020; the disclosure of which is incorporated by reference in its entirety herein.

BACKGROUND

This disclosure relates to abrasive tips for rotatable blades. Abradable seals or coatings (rub coatings) can be used to protect moving parts from damage during rub interaction while providing a small clearance. Such seals are used in turbomachines to interface with abrasive tips of a rotating blade stage.

SUMMARY

A blade according to an exemplary embodiment of this disclosure, among other possible things includes an airfoil section extending between leading and trailing edges, first and second opposed sides each joining the leading and trailing edges, and an inner end and a free end. The blade also includes an abrasive tip at the free end of the airfoil section. The abrasive tip includes particles disposed in a matrix material. The matrix material is a polymeric material that has a glass transition temperature greater than or equal to about 225 degrees C. (437 degrees F.).

In a further example of the foregoing, the airfoil section comprises an aluminum or aluminum-based material.

In a further example of any of the foregoing, the particles include at least one of alumina (Al2O3), zirconia (ZrO2), oxides, nitrides, carbides, oxycarbides, oxynitrides, diamond and combinations thereof.

In a further example of any of the foregoing, the matrix material includes at least one of polyamide, polyimide, bismaleimide, or combinations thereof.

In a further example of any of the foregoing, the blade includes fibers disposed in the matrix.

In a further example of any of the foregoing, the fibers are disposed in a proximal area of the abrasive tip and the particles are disposed in a distal area of the abrasive tip.

In a further example of any of the foregoing, the blade includes an adhesive bonding the abrasive tip to the airfoil section.

In a further example of any of the foregoing, the airfoil section includes an overcoat.

In a further example of any of the foregoing, the airfoil section includes a reinforcement at the leading edge.

In a further example of any of the foregoing, the blade is a fan blade for a gas turbine engine.

A gas turbine engine according to an exemplary embodiment of this disclosure, among other possible things includes a compressor section, a combustor in fluid communication with the compressor section; a turbine section in fluid communication with the combustor, and a fan rotatably coupled with the turbine section. The fan includes a plurality of circumferentially-spaced rotatable blades. Each of the blades include an airfoil section extending between leading and trailing edges, first and second opposed sides each joining the leading and trailing edges, and an inner end and a free tip end and an abrasive tip at the free end of each airfoil section. The abrasive tip includes particles disposed in a matrix material. The matrix material is a polymeric material that has a glass transition temperature greater than or equal to about 225 degrees C. (437 degrees F.). The gas turbine engine also includes a seal circumscribing the plurality of circumferentially-spaced rotatable blades, the seal being contactable with, and abradable by, the abrasive tip.

In a further example of the foregoing, the matrix material includes at least one of polyamide, polyimide, bismaleimide, or combinations thereof.

In a further example of any of the foregoing, the gas turbine engine includes fibers disposed in the matrix.

In a further example of any of the foregoing, the fibers are disposed in a proximal area of the abrasive tip and the particles are disposed in a distal area of the abrasive tip.

A method of fabricating a blade according to an exemplary embodiment of this disclosure, among other possible things includes fabricating an abrasive tip, the abrasive tip comprising particles disposed in a matrix material; and attaching the abrasive tip to a free end of an airfoil section of a blade after the fabricating.

In a further example of the foregoing, the fabricating includes placing the matrix material into a mold, placing a layer of the particles into the mold over the matrix material, and consolidating the matrix material and the layer of particles such that the matrix material at least partially infiltrates the layer of the particles.

In a further example of any of the foregoing, the attaching includes bonding the abrasive tip to the free end of the airfoil section by an adhesive.

In a further example of any of the foregoing, the consolidating includes elevating the temperature of the matrix material and layer of particles to a first temperature that is higher than a glass transition temperature of the matrix material. The bonding includes curing the adhesive at a second temperature. The second temperature is lower than the first temperature.

In a further example of any of the foregoing, the fabricating includes forming a prepeg, the prepeg including fibers disposed in the matrix material; placing the prepeg into a mold; placing a layer of the particles into the mold over the prepeg; and consolidating the prepeg and the layer of particles such that the matrix material at least partially infiltrates the layer of particles.

In a further example of any of the foregoing, the airfoil section includes at least one of an overcoat and a reinforcement prior to the attaching.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
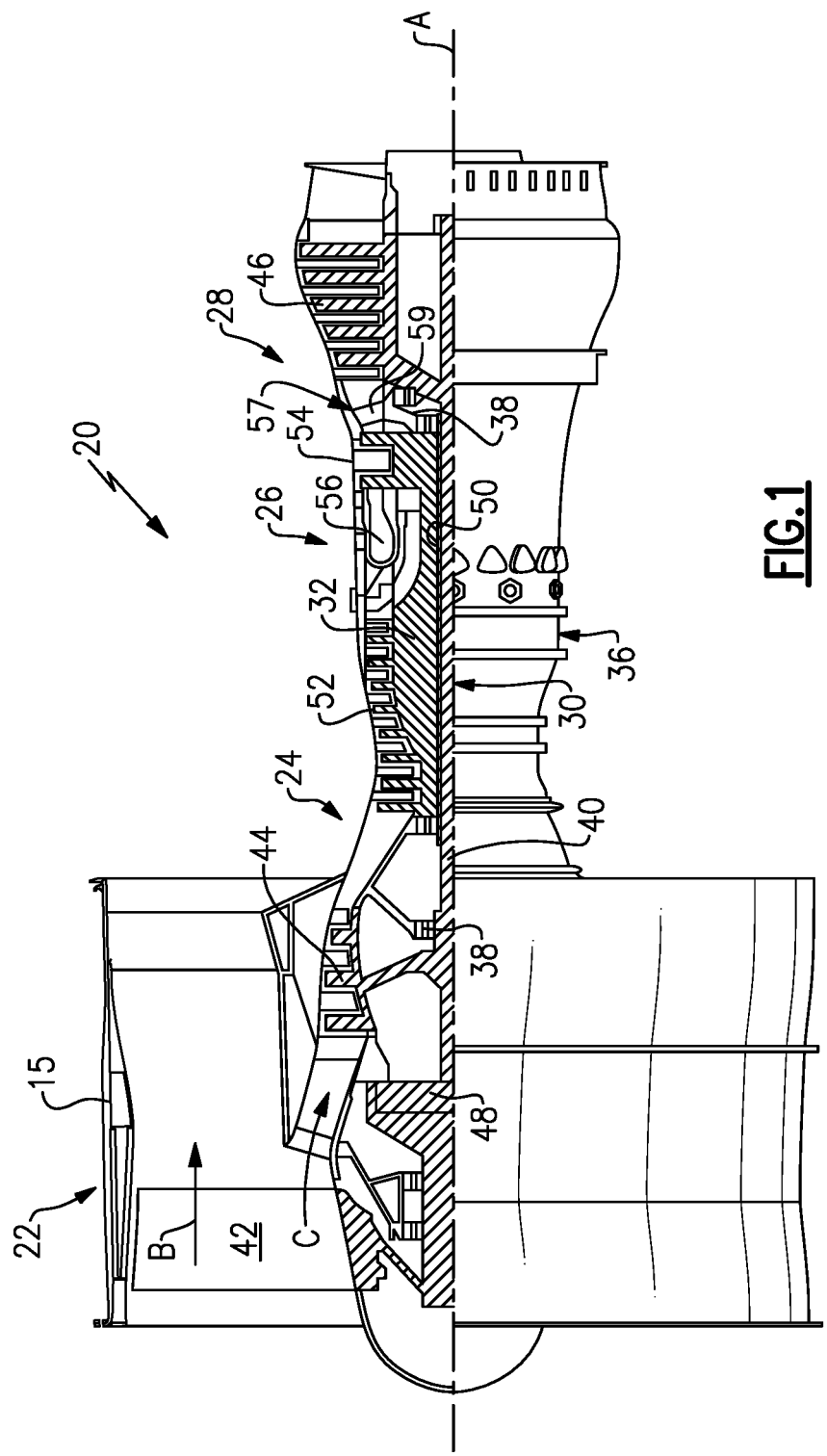
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R.)/(518.7° R.)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan 42 blades 62. In another non-limiting embodiment, the fan section 22 includes less than about 20 fan 42 blades 62. Moreover, in one disclosed embodiment the low pressure turbine 46 includes no more than about 6 turbine rotors. In another non-limiting example embodiment the low pressure turbine 46 includes about 3 turbine rotors. A ratio between the number of fan 42 blades 62 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 62 in the fan section 22 disclose an example gas turbine engine 20 with increased power transfer efficiency.

Figure 2:
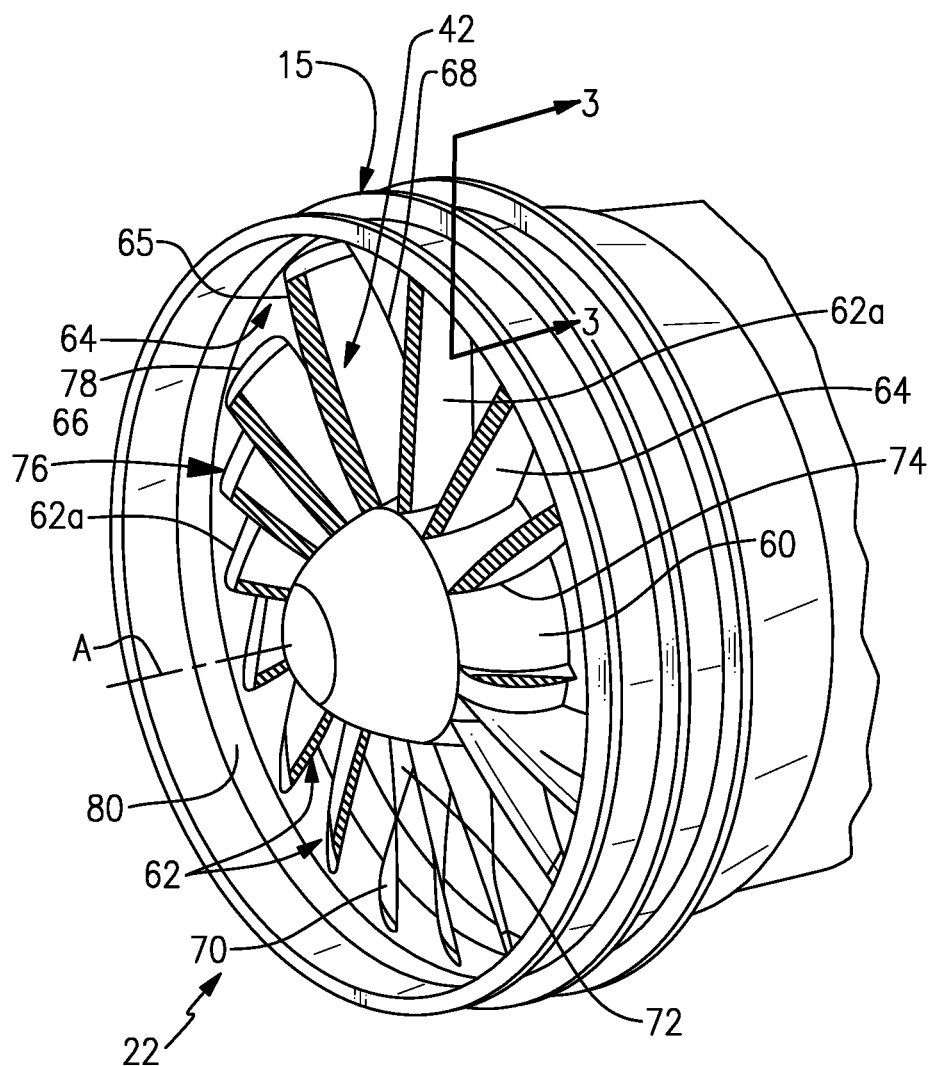
FIG. 2 illustrates an isolated view of the fan section of the gas turbine engine of FIG. 1.

FIG. 2 illustrates an isolated view of the fan section 22 of the engine 20. Though the description herein is made in reference to the fan section 22, it should be understood that the features described herein could be used in other parts of the engine 20 as well. The fan 42 includes a rotor 60 that has a plurality of circumferentially-spaced blades 62. Each blade 62 includes an airfoil section 64 that extends between leading and trailing edges 66/68, first and second opposed sides 70/72 that each joins the leading and trailing edges 66/68, and an inner end 74 and a free tip end 76.

Figure 3:
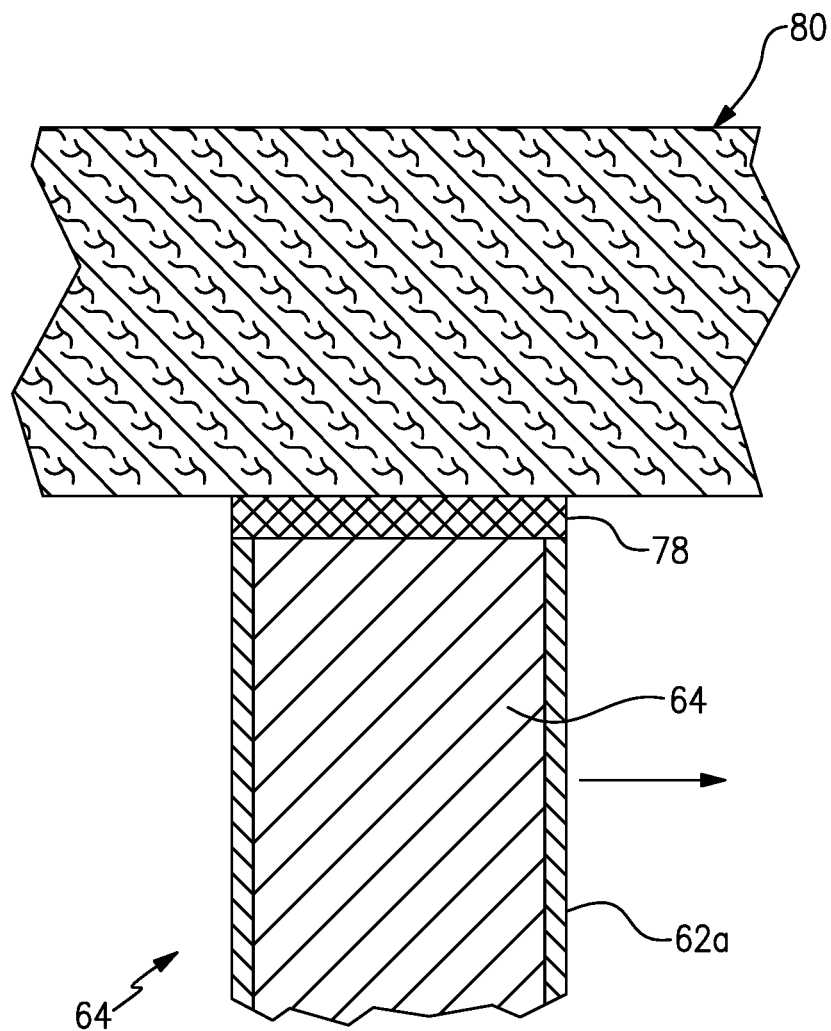
FIG. 3 illustrates an abrasive tip interfacing with an abradable seal.

FIG. 3 shows a cutaway view of a representative portion of the airfoil section 64 of one of the blades 62 and a portion of the abradable seal 80. The airfoil section 64 could be formed of a metallic material, such as aluminum or an aluminum alloy. In other examples, the airfoil section 64 could be formed of a ceramic-base composite, such as a carbon fiber composite. In some examples, the airfoil section 64 includes a protective overcoat 62a, such as a polymeric overcoat. For instance, the polymeric overcoat 62a could protect the underlying airfoil section 64 from erosion due to foreign particulate ingested into the engine 20. The overcoat 62a can be a polyurethane-based coating, an epoxy-based coating, or a silicone rubber-based coating, but is not limited to these types of coatings or materials. The overcoat 62a can cover the first and second sides 70/72 of the blades 62 and can span the entire lateral surface of the blade 62 between the leading and trailing edges 66/68. The overcoat 62a could be bonded to the airfoil section 64 by an adhesive such as an epoxy or epoxy-based adhesive.

The airfoil section 64 can include reinforcements 65 along the leading edge 66 of the airfoil section. The reinforcements 65 could be made of metallic material, such as titanium or titanium-based alloys. The reinforcements 65 could protect the airfoil section 64 from damage upon encountering a foreign object, for example. Though the example reinforcements 65 in FIG. 2 are shown along the leading edge 66 of the airfoil section 64, other reinforcements are contemplated. Furthermore, though the example reinforcements 65 in FIG. 2 track along the entire leading edge 66, in other examples, the reinforcements could track along less than the entire leading edge 66. The reinforcements 65 could be bonded to the airfoil section 64 by an adhesive such as an epoxy or epoxy-based adhesive.

Each blade includes an abrasive tip 78 at the free tip end 76. The fan case 15 is annular in shape and circumscribes the blades 62. The fan section 22 is designed such that the abrasive tips 78 of the blades 62 rub against the fan case 15 during rotation. In this regard, the fan case 15 includes an abradable seal 80 mounted on a radially inner side of the fan case 15. The abradable seal 80 can be formed of a polymeric-based material, such as a polymer matrix composite, in some examples.

When two components are in rubbing contact, at least one of the components may wear. The term "abradable" refers to the one of the two components that wears, while the other component is "abrasive" and does not wear or wears less. Thus, when the abrasive tips 78 of the blades 62 rub against the seal 80, the seal 80 will be worn whereas the abrasive tips 78 will not wear or will wear less than the seal 80. The word "abrasive" thus also implies that there is or can be contact with an abradable component.

Friction between a blade tip and a surrounding case generates heat. The heat can be conducted into the case, into the blade, or both. However, in particular for metal blades 62 and polymeric-based seals 80, the metal of the blade 62 is generally a better thermal conductor than the polymer of the seal 80, and a majority of the heat thus can conduct into the blade. While this may normally not present any detriments for a plain metal blade, the heat conduction can be detrimental to a metal blade that has an overcoat 62a and/or reinforcements 65. The heat can cause softening and/or flow of the adhesives discussed above, which can cause delamination of the polymeric overcoat and thus compromise the erosion protection and/or loosen the bond between the blade 62 and reinforcements 65. Furthermore, some abrasive tips require extremely high processing temperatures during the process of manufacturing the abrasive tip. In this regard, the subsequent disclosure provides an abrasive tip 78 with suitable abrasive properties and improved temperature resistance and an improved method of manufacturing the abrasive tip 78.

Figure 4:
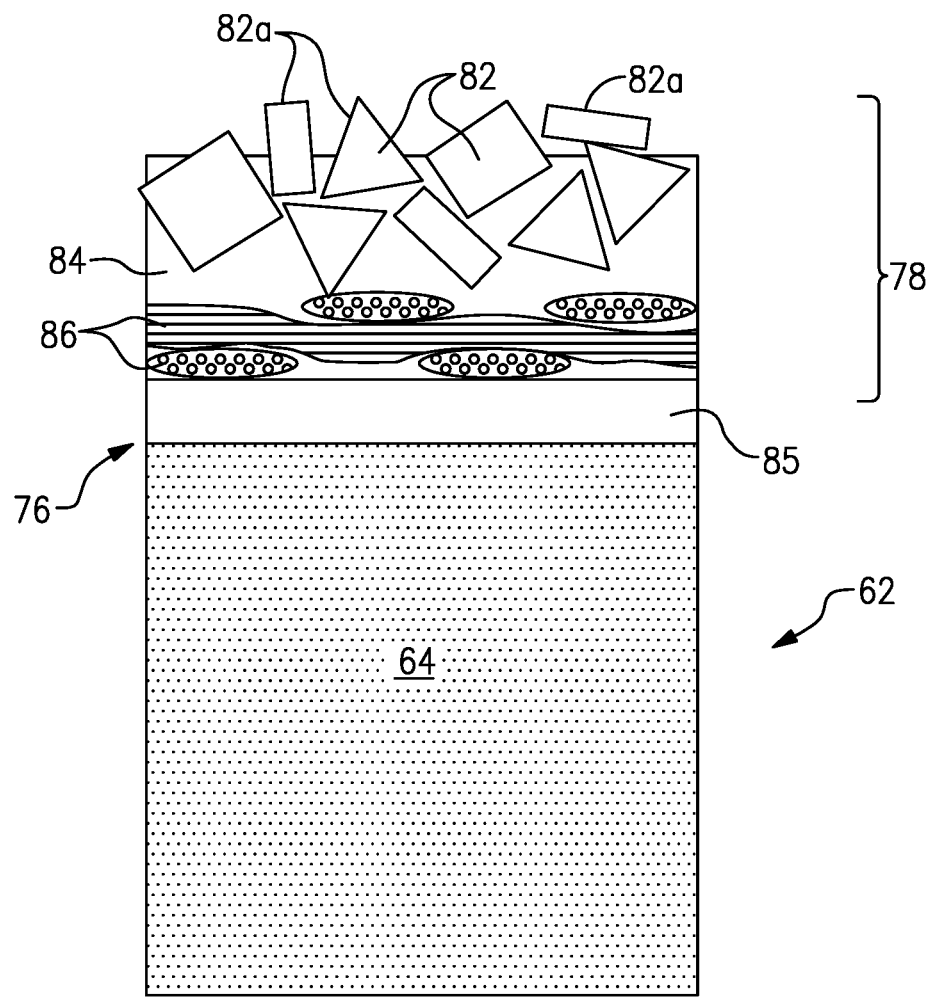
FIG. 4 illustrates a cross-section of an abrasive tip.

FIG. 4 illustrates a cross-section of representative portion of an example abrasive tip 78. The example abrasive tip 78 includes hard "grit" particles 82 in a matrix 84. The abrasive tip 78 is attached to the airfoil section 64 by an adhesive 85, such as an epoxy or epoxy-based adhesive. Any suitable grit particles 82 known in the art could be used. For example, the particles 82 could be ceramic-based particles such as alumina ($Al_2O_3$), zirconia ($ZrO_2$), other oxides, nitrides, carbides, oxycarbides, oxynitrides, diamond and combinations thereof. The matrix 84 is a polymeric-based material with a high glass transition temperature, for example, a glass transition temperature of greater than or equal to about 225 degrees C. (437 degrees F.). In a further example, the glass transition temperature of the matrix 84 material is greater than or equal to about 275 degrees C. (527 degrees F.). Example matrix 84 materials include polyamides, polyimides, bismaleimide, and combinations thereof. The high glass transition temperature of the matrix 84 provides improved heat resistance to the abrasive tip 78. First, the high glass transition temperature improves retention of the hard particles 82 in the abrasive tip 78 and maintenance of the thickness of the abrasive tip 78 during operation of the engine 20 because the matrix 84 has improved resistance to flow even under rubbing conditions, which generate heat as discussed above. This in turn contributes to improved longevity of the abrasive tip 78.

Also, the matrix 84 material has low heat conductivity as compared to metal matrix materials. In one example, the heat conductivity of the matrix 84 material is about 2 W/(mK) for temperatures in the range of about 150-200 degrees C. (302-392 degrees F.). Metal matrix materials have heat conductivities for a similar temperature range of about 75 W/(mK). Therefore, the heat conductivity of the matrix 84 material is about an order of magnitude or more lower than metallic matrix abrasives. The low heat conductivity of the matrix 84 material reduces heat transfer to the adhesive 85 and other parts of the blade 62 such as the airfoil section 64 and the reinforcements 65. This in turn mitigates possible softening/weakening of the adhesive 85 that bonds the abrasive tip 78 to the airfoil section 64. Other adhesives in other parts of the blade 62, such as adhesives used to bond reinforcements 65 to the airfoil section 64 or adhesives used to bond overcoat 62a to the blade 62, as discussed above, benefit as well.

The hard particles 82 can have an average maximum dimension in a particle size range of 10-200 micrometers. The hard particles 82 may protrude from the matrix 84 or be completely covered by the matrix 84. In the illustrated example in FIG. 4, the hard particles 82 are faceted and thus have angled facets 82a. The angled facets 82a provide relatively sharp corners that facilitate efficient "cutting" through the abradable seal 80 with low cutting forces, which lowers frictions and, in turn, contributes to lowering the amount of heat generated.

In some examples, the particles 82 are generally situated in a distal (e.g., furthest from the airfoil section 64) area of the abrasive tip 78, and the abrasive tip 78 further includes fibers 86 in the matrix 84 near a proximal end (e.g. nearest the airfoil section 64) of the abrasive tip 78. The fibers 86 could be carbon, glass, ceramic or polymeric-based fibers.

The fibers 86 in the example of FIGS. 4 and 6-B (discussed below) are arranged in a woven configuration, but it should be understood that other configurations, such as unidirectional or random orientations are also contemplated.

The fibers 86 may reinforce the abrasive tip 78 during manufacturing, which is discussed in more detail below. In general, the fibers 86 can provide improved strength for handling of the abrasive tip 78 during fabrication of the abrasive tip 78 and subsequent bonding of the abrasive tip 78 to the airfoil section 64. The fibers 86 can be selected to impart certain properties to the abrasive tip 78. In a particular example, the fibers 86 are carbon-based fibers, which have high thermal conductivity in their longitudinal direction which improves heat dissipation from individual particles 82 that are in rubbing contact with a mating surface (e.g., seal 80). This can assist in improving particle 82 retention in the matrix 84. In another example, the fibers 86 are silica-based glass fibers, which have lower thermal conductivity than carbon-based fibers. The lower thermal conductivity reduces heat dissipation to the adhesive 85 and can therefor assist in protecting the adhesive 85 from excessive heating.

Figure 5:
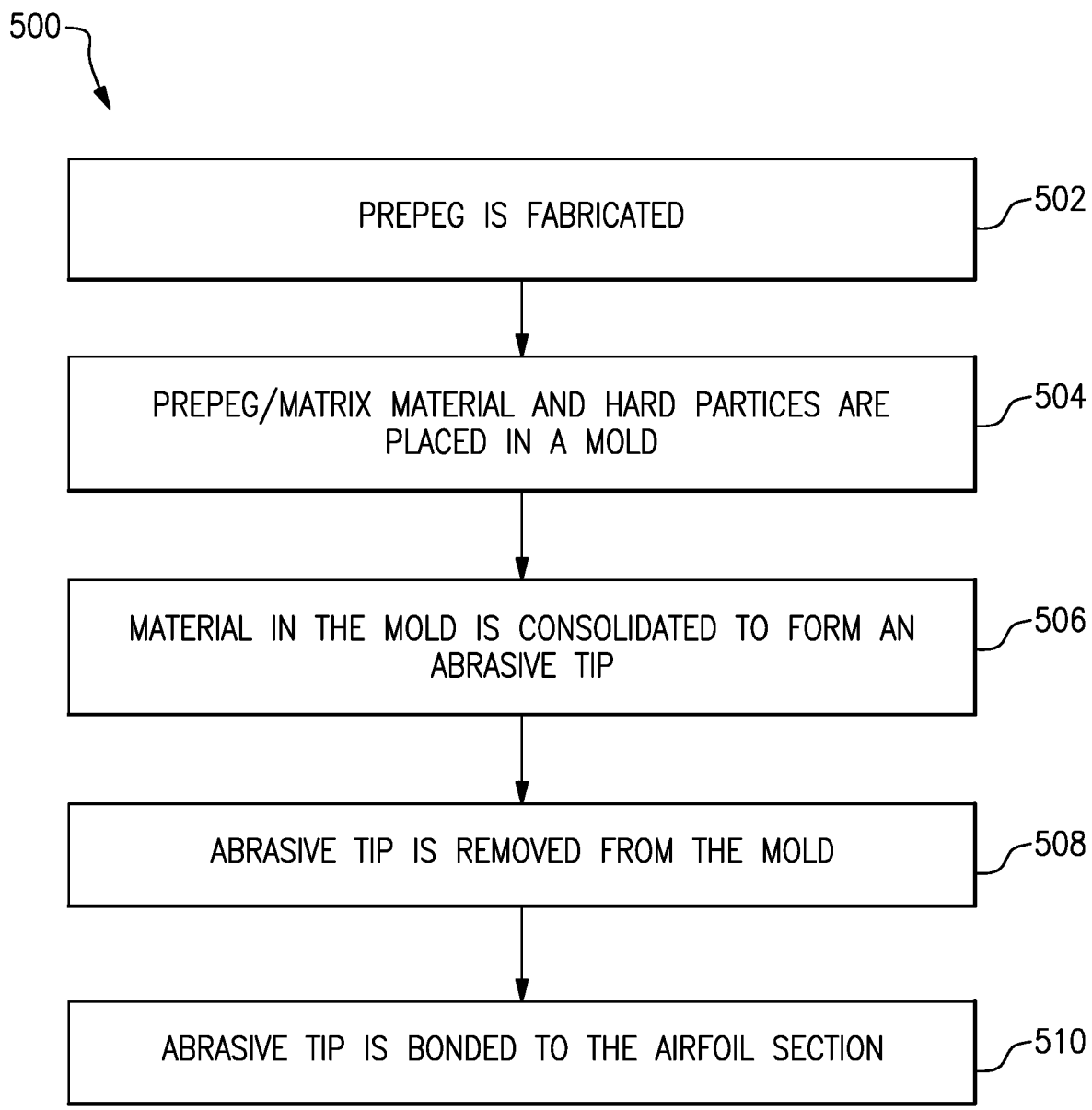
FIG. 5 illustrates a method of fabricating a blade.
Figure 6A:
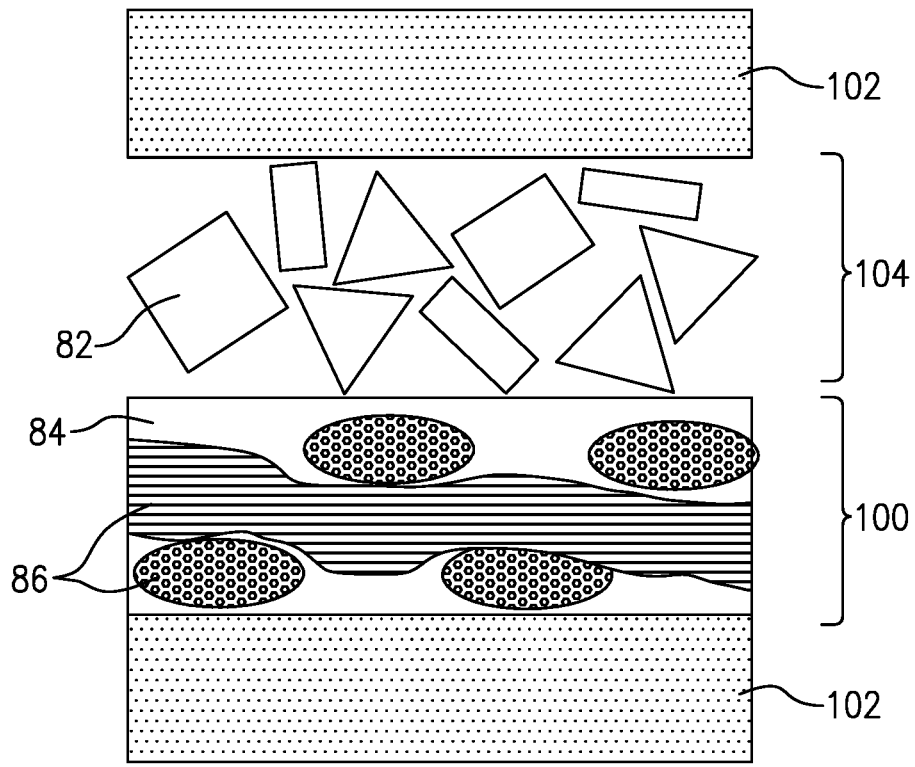
FIGS. 6A-B illustrate the blade during fabrication according to the method of FIG. 5.
Figure 6B:
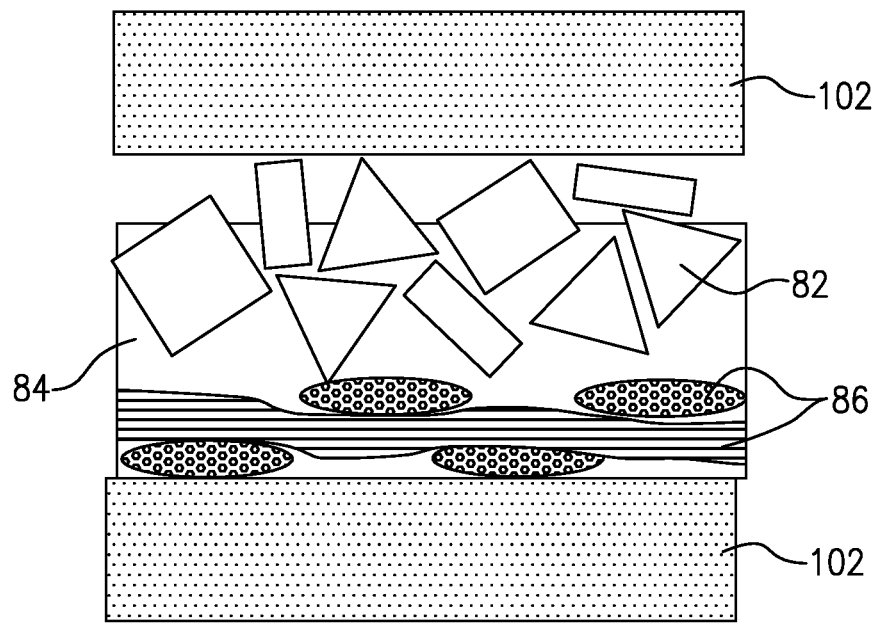

FIG. 5 schematically illustrates a method 500 of fabricating the abrasive tip 78. FIGS. 6A-B schematically illustrate the abrasive tip 78 during fabrication according to the method 500. In optional step 502, a prepeg 100 including fibers 86 and matrix 84 material is fabricated. The prepeg 100 can be fabricated according to any known method, but generally includes laying up the fibers 86 into an orientation and infiltrating the fibers with the matrix material 84.

In step 504, the prepeg 100 is placed in a mold 102 as shown in FIG. 6A. If a prepeg 100 is not being used, matrix material 84 is placed in the mold 102 in step 504. A layer 104 of hard particles 82 is placed in the mold over the prepeg 100/matrix material 84. The mold 102 can have a geometry that is similar to the final desired geometry of the abrasive tip 78. In other examples, the mold 102 can be used to form a larger product which can be machined to shape after the method 500 as would be known in the art.

In step 506, the material in the mold 102 is consolidated to form an abrasive tip 78 as shown in FIG. 6B. The consolidation can include the application of heat and/or pressure, in one example. For instance, the consolidation can include heating the matrix material 84 to a temperature above it glass transition temperature. In another example, the consolidation can include inducing vacuum in the mold. In general, the consolidation causes the matrix material 84 to partially or fully infiltrate the layer 104 of hard particles 82. The consolidation also causes consolidation of the prepeg 100, if being used.

In step 508, the abrasive tip 78 is removed from the mold. As discussed above, depending on the shape of the mold 102, the abrasive tip 78 may be machined to a desired shape after step 508.

In step 510, the abrasive tip 78 is attached to the airfoil section 64. For example, the abrasive tip 78 is bonded to the airfoil section 64 by adhesive 85, which could include applying the adhesive 85 to the abrasive tip 78 and/or airfoil section 64 and curing the adhesive 85 by any known method. The bonding can include priming steps that improve the bond of the adhesive 85, such as application of a primer material or any other priming steps as would be known in the art. The bonding includes curing the adhesive 85. In some examples, the airfoil section 64 already includes the overcoat 62a and/or the reinforcements 65 during step 510. In this regard, the overcoat 62a and/or reinforcements 65 are not subjected to the consolidation step 506, which in some examples could require elevated temperatures. Though heating could be used to cure the adhesive 85, in general, curing the adhesive 85 can be effectuated at lower temperatures than the consolidating step 506 discussed above. Therefore, the adhesives that bond the overcoat 62a/reinforcements 65 to the airfoil section 64 are not subjected to elevated temperatures which could cause softening or delamination as discussed above.

As discussed above, optional fibers 86 can reinforce the abrasive tip 78 to provide improved strength for handling of the abrasive tip 78 during steps 508 and 510.

Though the foregoing method 500 was described with respect to manufacture of the abrasive tip 78, Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade comprising:
an airfoil section extending between leading and trailing edges, first and second opposed sides each joining the leading and trailing edges, and an inner end and a free end; and
an abrasive tip at the free end of the airfoil section, wherein the abrasive tip includes particles disposed in a matrix material, and wherein the matrix material is a polymeric material that has a glass transition temperature greater than or equal to 225 degrees C. (437 degrees F.) and a heat conductivity of 2 W/(mK) for temperatures in a range of 150-220-200 degrees C. (302-392 degrees F.).

2. The blade as recited in claim 1, wherein the airfoil section comprises an aluminum or aluminum-based material.

3. The blade as recited in claim 1, wherein the particles include at least one of alumina ($Al_2O_3$), zirconia ($ZrO_2$), oxides, nitrides, carbides, oxycarbides, oxynitrides, diamond and combinations thereof.

4. The blade as recited in claim 1, wherein the matrix material includes at least one of polyamide, polyimide, bismaleimide, or combinations thereof.

5. The blade as recited in claim 1, further comprising fibers disposed in the matrix material.

6. The blade as recited in claim 5, wherein the abrasive tip has an end proximal to the airfoil section and a distal end distal from the airfoil section, and wherein the fibers are disposed in a proximal area of the abrasive tip and the particles are disposed in a distal area of the abrasive tip.

7. The blade as recited in claim 1, further comprising an adhesive bonding the abrasive tip to the airfoil section.

8. The blade as recited in claim 1, wherein the airfoil section includes an overcoat.

9. The blade as recited in claim 1, wherein the airfoil section includes a reinforcement at the leading edge.

10. The blade as recited in claim 1, wherein the blade is a fan blade for a gas turbine engine.

11. A gas turbine engine comprising:
a compressor section;
a combustor in fluid communication with the compressor section;

a turbine section in fluid communication with the combustor;

a fan rotatably coupled with the turbine section, the fan including a plurality of circumferentially-spaced rotatable blades, each of the blades including:

an airfoil section extending between leading and trailing edges, first and second opposed sides each joining the leading and trailing edges, and an inner end and a free tip end, and an abrasive tip at the free tip end of each airfoil section, wherein the abrasive tip includes particles disposed in a matrix material, and wherein the matrix material is a polymeric material that has a glass transition temperature greater than or equal to 225 degrees C. (437 degrees F.) and a heat conductivity of 2 W/(mK) for temperatures in a range of 150-220-200 degrees C. (302-392 degrees F.); and a seal circumscribing the plurality of circumferentially-spaced rotatable blades, the seal being contactable with, and abradable by the abrasive tip.

12. The gas turbine engine as recited in claim 11, wherein the matrix material includes at least one of polyamide, polyimide, bismaleimide, or combinations thereof.

13. The gas turbine engine as recited in claim 11, further comprising fibers disposed in the matrix material.

14. The gas turbine engine as recited in claim 13, wherein the abrasive tip has an end proximal to the airfoil section and a distal end distal from the airfoil section, and wherein the fibers are disposed in a proximal area of the abrasive tip and the particles are disposed in a distal area of the abrasive tip.

* * * * *